United States Patent
Chang et al.

[11] Patent Number: 6,118,864
[45] Date of Patent: Sep. 12, 2000

[54] SYSTEM AND METHOD FOR PROVIDING COMMUNICATION ON A WIDE AREA NETWORK

[75] Inventors: Jack H. Chang, Sunnyvale; Raymond L. Tong, Milpitas, both of Calif.

[73] Assignee: Carmel Connection, Inc., Fremont, Calif.

[21] Appl. No.: 09/001,859

[22] Filed: Dec. 31, 1997

[51] Int. Cl.[7] .............................. H04M 7/00; H04M 1/64
[52] U.S. Cl. ....................... 379/225; 379/219; 379/229; 379/88.17; 379/93.09; 370/352
[58] Field of Search .................... 379/225, 219, 379/220, 231, 232, 234, 201, 207, 93.09, 88.17, 88.18, 88.25, 93.01; 370/352, 259, 260

[56] References Cited

U.S. PATENT DOCUMENTS

| | | | |
|---|---|---|---|
| 5,031,206 | 7/1991 | Riskin | 379/97 |
| 5,039,980 | 8/1991 | Aggers et al. | 340/506 |
| 5,115,362 | 5/1992 | Harada et al. | 360/92 |
| 5,230,023 | 7/1993 | Nakano | 379/88.02 |
| 5,333,266 | 7/1994 | Boaz et al. | 395/200 |
| 5,349,636 | 9/1994 | Irribarren | 379/89 |
| 5,377,191 | 12/1994 | Farell et al. | 370/94.1 |
| 5,475,737 | 12/1995 | Garner et al. | 379/88.26 |
| 5,479,411 | 12/1995 | Klein | 370/110.1 |
| 5,530,740 | 6/1996 | Irribarren et al. | 379/89 |
| 5,557,659 | 9/1996 | Hyde-Thomson | 379/88 |
| 5,608,786 | 3/1997 | Gordon | 379/100 |
| 5,621,727 | 4/1997 | Vaudreuil | 379/225 |
| 5,625,675 | 4/1997 | Katsumaru et al. | 379/88.25 |
| 5,633,916 | 5/1997 | Goldhagen et al. | 379/67 |
| 5,647,002 | 7/1997 | Brunson | 380/49 |
| 5,675,507 | 10/1997 | Bobo, II | 364/514 R |
| 5,737,395 | 4/1998 | Irribarren | 379/88 |
| 5,740,231 | 4/1998 | Cohn et al. | 379/89 |
| 5,742,596 | 4/1998 | Baratz et al. | 370/356 |
| 5,745,689 | 4/1998 | Yeager et al. | 395/200.36 |
| 5,751,960 | 5/1998 | Matsunaga | 395/200.36 |
| 5,781,186 | 7/1998 | Jennings | 345/302 |

(List continued on next page.)

OTHER PUBLICATIONS

"Microsoft Press Computer Dictionary", Microsoft Press, Third Edition, Copyright 1997 by Microsoft Corporation, p. 366.

*Primary Examiner*—Harry S. Hong
*Assistant Examiner*—Benny Q. Tiell
*Attorney, Agent, or Firm*—D'Alessandro & Ritchie

[57] ABSTRACT

In a first aspect of the present invention, at least one communication platform is networked to a switched backbone, such as the network commonly referred to as the Internet, and is configured to communicate with and manage at least one network interface, such as a private branch exchange (PBX), and a voice communication module so as to provide telecommunication services that includes voice-over-IP communication between or among communication platform users and call-holding, transferring, forwarding, conferencing, and the like (PBX-like features). The communication platform networked through the switched backbone with other communication platforms. The communication platform is networked to the switched backbone through a first network interface and to telephone lines driven by PBX equipment through a PBX network interface and/or to a telephone compatible network such as a public switched telephone network (PSTN) through a telephone network interface. Additional network interfaces may be included to support additional networks such as a local area network separately or in conjunction with other described networks. The communication platform manages the network interfaces, the voice communication module, and the PBX equipment through program control so as to provide telecommunication services which includes providing voice communication between a first user and a second user and PBX-like features. Each user may be on different networks that are networked to the switched backbone via the network interfaces.

91 Claims, 9 Drawing Sheets

U.S. PATENT DOCUMENTS

| | | | |
|---|---|---|---|
| 5,786,770 | 7/1998 | Thompson | 340/825.06 |
| 5,794,039 | 8/1998 | Guck | 395/683 |
| 5,805,692 | 9/1998 | Oerlemans et al. | 379/225 |
| 5,812,795 | 9/1998 | Horovitz et al. | 395/200.75 |
| 5,815,553 | 9/1998 | Baugh et al. | 379/88.01 |
| 5,825,868 | 10/1998 | Diamond | 379/225 |
| 5,838,458 | 11/1998 | Tsai | 358/402 |
| 5,841,839 | 11/1998 | Fogg et al. | 379/225 |
| 5,850,430 | 12/1998 | Hamalainen | 379/93.02 |
| 5,940,479 | 8/1999 | Guy et al. | 379/93.01 |
| 5,941,829 | 8/1999 | Saltzstein et al. | 600/509 |
| 5,949,866 | 9/1999 | Coiera et al. | 379/210 |
| 5,974,449 | 10/1999 | Chang et al. | 709/206 |

SYSTEM AND METHOD FOR PROVIDING COMMUNICATION ON A WIDE AREA NETWORK

BACKGROUND OF THE INVENTION

1. Field of the Invention

This invention relates to wide area network communication. More particularly, the present invention relates to providing private branch exchange services on a wide area network.

2. Background

Private branch exchange (PBX) networks are known. A typical stand-alone PBX includes a collection of telephone extensions that transceive telephone calls to and from the PBX. The PBX is connected to an outside telephone network such as a public switch telephone network (PSTN). The PBX functions as a central point in which outside phone calls made through the PBX extensions are funneled for transmission to and from at least one PSTN line so that more than one PBX extension may be shared with a single PSTN line. Specifically, the PBX treats each PSTN line connected to the PBX as a non-dedicated line that may be sequentially shared to support voice traffic originating from any of the PBX extensions. This reduces the number of PSTN lines that would have been required to support each extension if a PBX was not used. Also, a typical PBX enables a user at one extension to use features offered by the PBX with another user at another extension supported by the PBX.

However, a PBX suffers from the following disadvantages. First, a PBX is limited to providing PBX features to only those users with access to the PBX's extensions. Users that do not have access to the PBX extensions, such as those who call in from an outside line, cannot use the features offered by the PBX. Thus, a stand-alone PBX is limited to supporting telephones that are directly connected to a PBX extension. Second, PBX features must generally be initiated through special keystroke sequences that must be known or memorized by a user when using single line phones, limiting the usefulness of such features since they require user knowledge and proficiency. Using proprietary phones having specialized keys avoids the need for user memorization but has the disadvantages of added cost and incompatibility with other PBX systems.

Accordingly, it would be desirable to provide a telecommunication platform and network that provides PBX-like features to every user of a telephone or user engaging in a telephone call that can be routed through a standard telephone network such as a PSTN.

Moreover, it would be desirable to provide a telecommunication platform and network that provides voice prompting to a user, enabling the user to perform network services such as voice communication simply by following a voice prompt rather than by memorizing complex keystroke sequences.

SUMMARY OF THE INVENTION

In a first aspect of the present invention, at least one communication platform is networked to a switched backbone, such as the network commonly referred to as the Internet, and is configured to communicate with and manage at least one network interface, such as a private branch exchange (PBX), and a voice communication module so as to provide telecommunication services that includes voice-over-IP communication between or among communication platform users and call-holding, transferring, forwarding, conferencing, and the like (PBX-like features). The communication platform is networked through the switched backbone with other communication platforms. The communication platform is networked to the switched backbone through a first network interface and to telephone lines driven by PBX equipment through a PBX network interface and/or to a telephone compatible network such as a public switched telephone network (PSTN) through a telephone network interface. Additional network interfaces may be included to support additional networks such as a local area network separately or in conjunction with other described networks. The communication platform manages the network interfaces, the voice communication module, and the PBX equipment through program control so as to provide telecommunication services which includes providing voice communication between a first user and a second user and PBX-like features. Each user may be on different networks that are networked to the switched backbone via the network interfaces.

In a second aspect of the present invention, the communication platform may also provide telecommunication services that include multimedia messaging and information services such as those described in commonly owned and co-pending U.S. patent application Ser. No. 08/853,290 filed May 9, 1997, entitled, "APPARATUS AND METHOD FOR PROVIDING MULTIMEDIA MESSAGING BETWEEN DISPARATE MESSAGING PLATFORMS," hereinafter referred to as the ("multimedia messaging invention"); and commonly owned and co-pending U.S. Patent Application Serial No.(not yet assigned) filed Oct. 6, 1997, entitled, "SYSTEM AND METHOD FOR MANAGING MULTI-MEDIA MESSAGING PLATFORMS," hereinafter referred to as the ("managing multimedia messaging invention"). The complete disclosure of the foregoing patent applications is hereby incorporated herein by reference as if set forth fully herein.

DETAILED DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using circuitry in a microprocessor adapted to the particular process steps and data structures, and that implementation of the process steps and data structures described herein would not require undue experimentation or further invention.

Apparatus And System

Figure 1A:
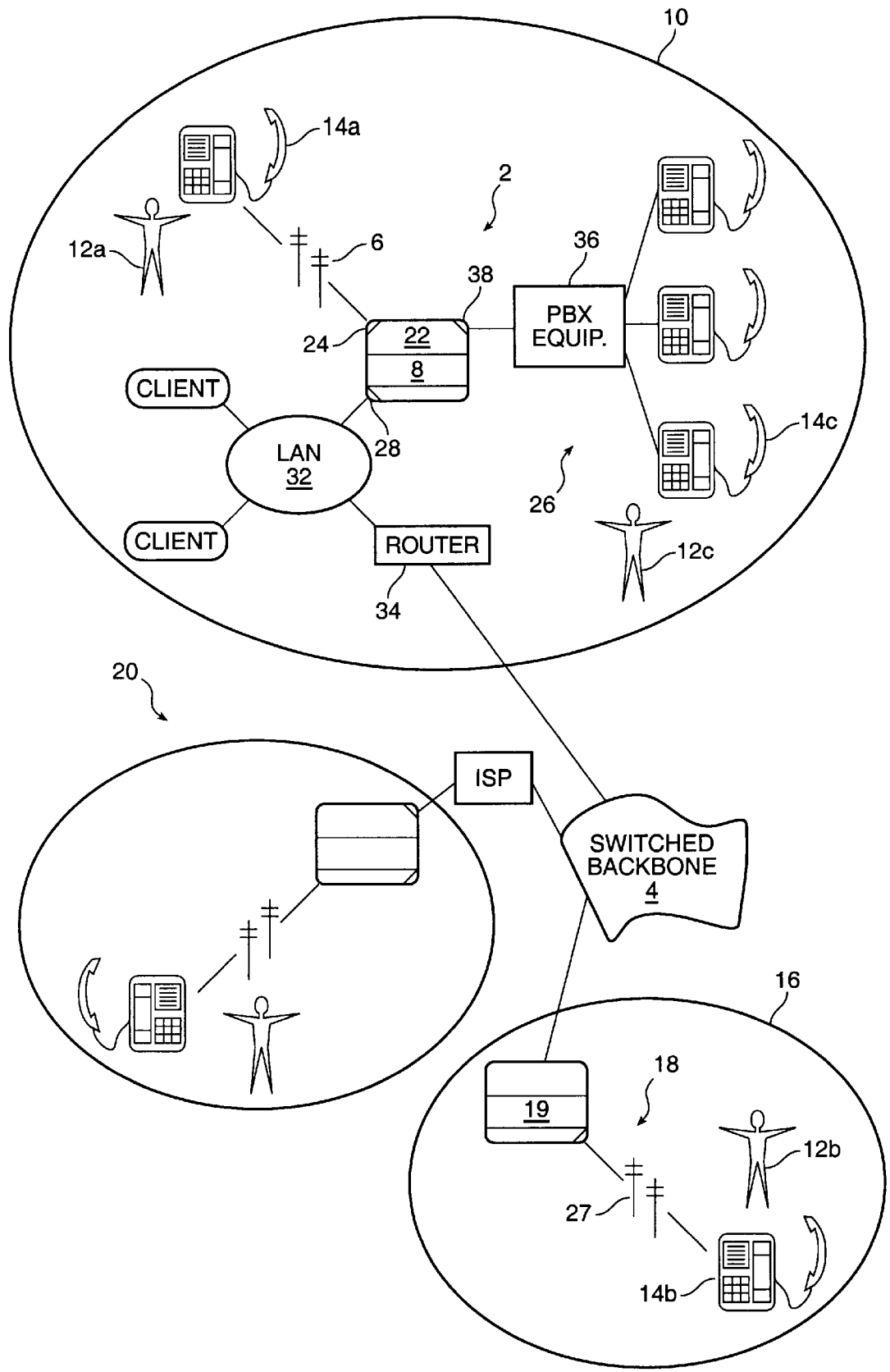
FIG. 1A is a schematic block diagram of a telecommunication system that networks more than one autonomous communication platform to a variety of networks which includes the Internet, a public switched telephone network (PSTN), and a private branch exchange (PBX) network in accordance with a presently preferred embodiment of the present invention.

FIG. 1A is a schematic block diagram of a telecommunication system that uses a variety of networks which includes the Internet, a public switched telephone network and a private branch exchange network in accordance with a presently preferred embodiment of the present invention.

In a first aspect of the present invention, a communication platform 2 is networked to a switched backbone 4, such as the Internet, and to at least one other network that supports voice communication through telephones, such as a PSTN 6. Communication platform 2 is integrated with a voice communication module 8, serving a service area 10. Communication platform also may be configured to have the same multimedia messaging features as the communication platform described in the to multimedia messaging invention. Voice communication module 8 enables communication platform 2 to provide voice-over-IP calls over switched backbone 4 between a supported user, such as user 12a located at telephone 14a, and at least one other user, such as user 12b located at PBX telephone extension 14b. User 12b may be located at a service area 16 supported by another communication platform, such as communication platform 18, that is also integrated with a voice communication module 19 that provides voice communication through switched backbone 4. Communication platform 18 may be located at another location around the globe so long as it can ultimately connect to switched backbone 4.

A voice-over-IP communication or call in the present invention is defined as including any voice communication made from a communication platform which requires transmission of the communication over switched backbone 4.

The networked communication platforms form a global communication system 20 capable of supporting voice communication between or among users, while also offering PBX-like features, such as call holding, call transferring, call forwarding, call conferencing, and the like, to each user having a telephone on a network that is interfaced to each respective user's communication platform which is connected to switched backbone 4. In essence, a global PBX is formed that treats any telephone networked to any of the communication platforms as a PBX telephone extension of the global PBX.

Figure 1B:
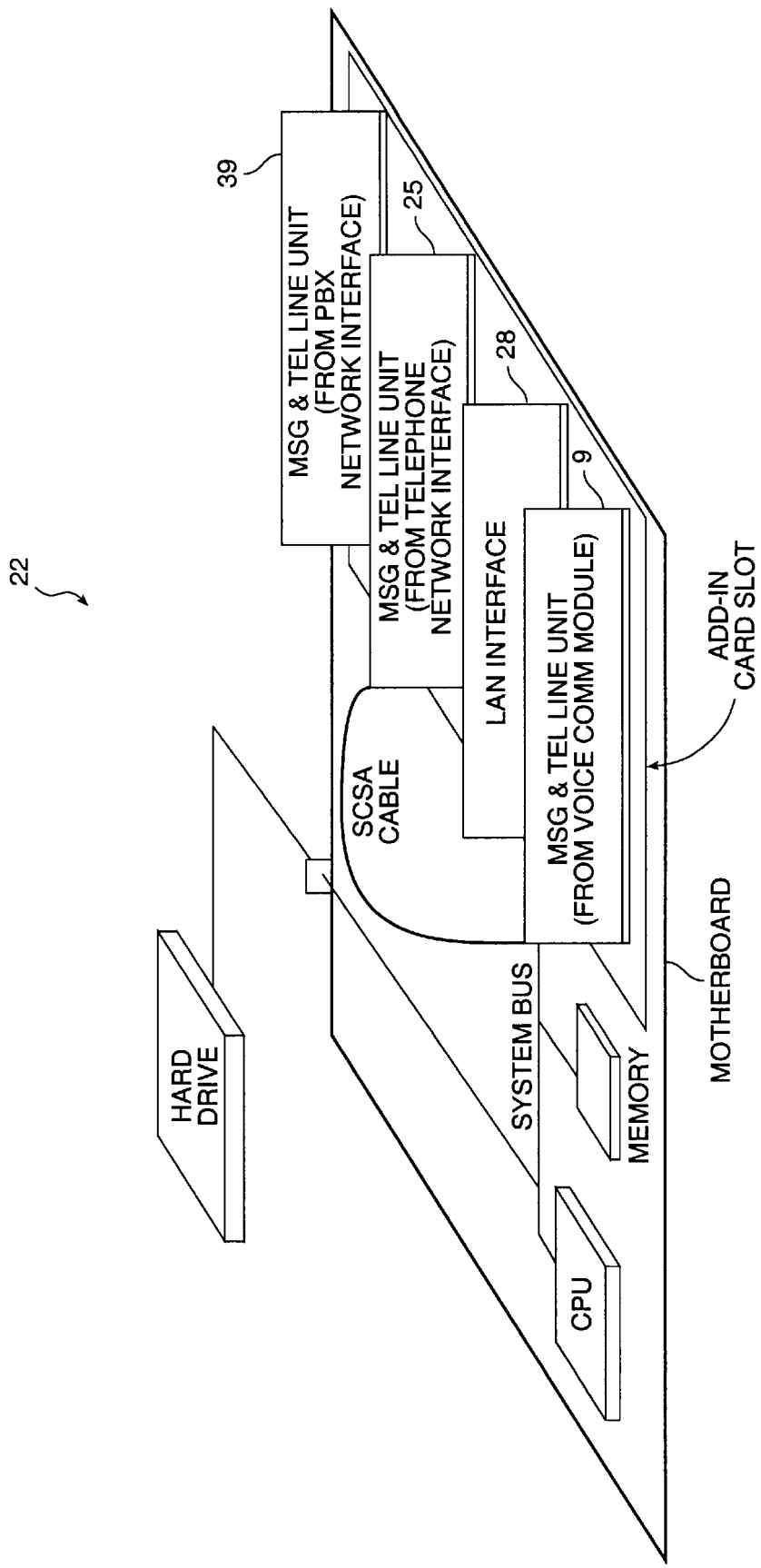
FIG. 1B is a perspective diagram of a communication platform integrated with a voice communication module in accordance with a preferred embodiment of the present invention.

FIG. 1B is a diagram of a communication platform integrated with a voice to communication module in accordance with a preferred embodiment of the present invention.

Communication platform 2 consists of a general purpose computer system 22 that operates under program control and having, among other things, a motherboard coupled to a hard drive and having add-in card slots, a CPU, system bus, and internal memory, such as that described in, "Service Communication Platform," release 2.0, available from Carmel Connection, Incorporated, located at 41432 Christy Street, Fremont, Calif., 94538, hereby incorporated by reference as if fully set forth herein; and may include additional features and embodiments that are described in the multimedia messaging and managing multimedia messaging inventions. Also referring to FIG. 1A, computer system 22 also contains a telephone network interface 24 for transceiving and managing telephone calls received from a telephone network, such as PSTN 6.

Telephone network interface 24 includes a messaging and telephone line unit 25 that is inserted into an available add-in slot on computer system 22. In a preferred embodiment of the present invention, messaging and telephone line unit 25 is from Dialogic Corporation of Parsippany, N.J., having model number D41ESC (Dialogic board) which supports SCSA (Signal Computing System Architecture) time slot routing. Control of messaging and telephone line unit 25 is by program control using modules that make API (application program interface) calls to a programming interface, which is available from Dialogic Corporation, that is compatible with the Dialogic board.

Also, communication platform 2 is integrated with a voice communication module 8 so that telephone calls received from a telephone network, such as from PSTN 6 or from PBX network 26, can be switched and transmitted to another communication platform through switched backbone 4. In accordance with a preferred embodiment of the present invention, voice communication module 8 includes a messaging and telephone line unit 9 that is available from Dialogic Corporation of Parsippany, N.J., having model number D41ESC and that supports SCSA time slot routing (Dialogic board). Voice communication module 8 also includes a programming interface, which is available from Dialogic Corporation, that is compatible with the Dialogic board.

Integration of voice communication module 8 with communication platform 2 is accomplished by inserting messaging and telephone line unit 9 into an available add-in card slot on computer system 22 and connecting it to messaging and telephone line unit 25 by using a cable to connect their corresponding SCSA buses together. This permits communication platform 2 to switch voice information from telephone network interface 24 to voice communication module 8 through their respective SCSA buses.

The SCSA bus is a time division multiplexing (TDM) bus capable of supporting 1024 time slots and is an industry standard bus sponsored by Dialogic Corp. Digitized voice information is passed through a time slot on the SCSA bus from telephone network interface 24 to voice communication module 8, providing voice-over-IP communication and other PBX-features such as call conferencing to and from communication platform 2 to another communication platform via a switched backbone, such as the Internet, when managed under program control.

Program modules are used to control the Dialogic board through API calls to the Dialogic board's program interface. In addition, data is passed from telephone network interface 24 to voice communication module 8 through the internal memory of computer system 22. For example, a destination telephone number dialed in by a user on a DTMF telephone keypad is received by telephone network interface 24 and stored by the communication platform as an ASCII string in a predetermined location in the internal memory. Communication platform 2 passes the data to voice communication module 8 by providing a memory address corresponding to the predetermined location in memory and issuing an API call to the program interface associated with voice communication module 8. Voice communication module 8 then obtains the ASCII string using the memory address passed through the API call, determines which destination communication platform supports that telephone number, initiates a voice-over-IP call to the corresponding communication platform, which in turn, places a PSTN telephone call using the telephone number.

In response, the destination communication platform makes a telephone call using the telephone number on a local telephone network, such as PSTN 27, returns the status of the telephone call (such as ring-no-answer, busy, or live answer) to voice communication module 8 through switch backbone 4. Voice communication module 8 stores the status of the telephone call in a predetermined location in the internal memory of computer system 22 such as at a memory location reserved for status messages. The communication platform through computer system 22 may then either poll the memory location reserved for status messages or may be interrupted by voice communication module 8 when the status is received.

Referring to both FIGS. 1A and 1B, as described in the multimedia messaging and managing multimedia messaging platforms inventions, communication platform 2 may also include a LAN interface 28, such as a LAN card, for networking to a local area network 32. A communication platform may be connected to the switched backbone through a switched backbone network interface directly, such as communication platform 18, or through a LAN card and router 34, such as communication platform 2. Communication platform 2 also supports networking to telephone extensions driven by private branch exchange (PBX) equipment 36 through PBX network interface 38 and/or to a telephone network, such as PSTN 6, through telephone network interface 24.

Like telephone network interface 24, PBX network interface 38 is implemented by using a messaging and telephone line unit 39 running under program control. PBX network interface 38 is provided by communication platform 2 using messaging and telephone line unit 39 attached to an available add-in slot on computer system 22. In a preferred embodiment of the present invention, messaging and telephone line unit 39 is from Dialogic Corporation of Parsippany, N.J., having model number D41ESC (Dialogic board) which supports SCSA time slot routing. PBX network interface 38 is managed and controlled by computer system 22 through program control using modules that make API calls to the programming interface corresponding to the Dialogic board. This enables communication platform 2 to send and receive telephone calls from extensions defined within a PBX network, such as PBX network 26, that ultimately travel through switched backbone 4.

Figure 1C:
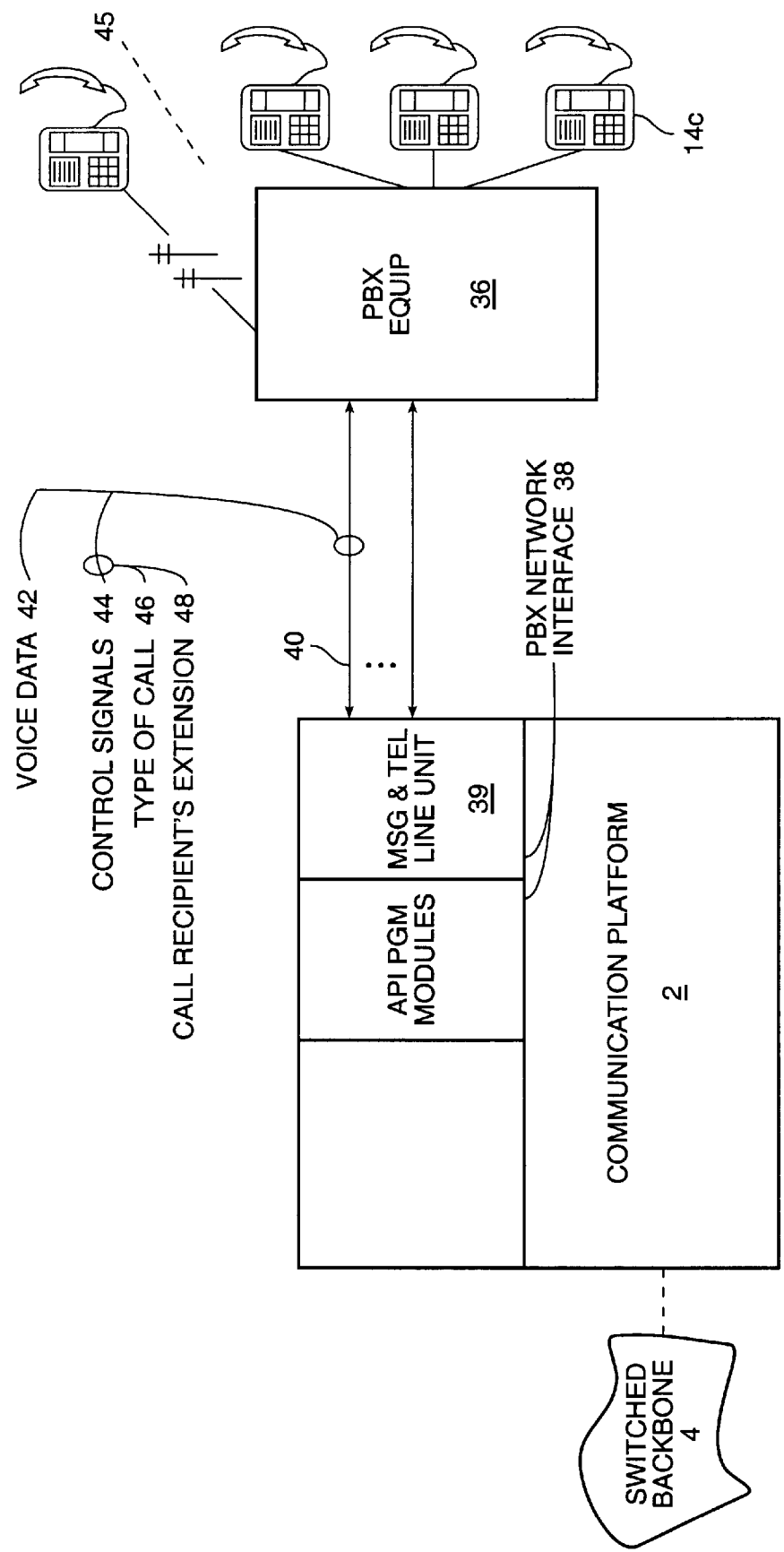
FIG. 1C is a block diagram of the integration between a communication platform and a PBX network in accordance with a preferred embodiment of the present invention.

Turning now to FIG. 1C, a block diagram of communication platform 2 integrated with PBX equipment 36 in accordance with a preferred embodiment of the present invention is shown.

Messaging and telephone line unit 39 is coupled to PBX equipment 36 through a single line telephone connection 40, commonly known as a tip and ring pair, enabling the transfer of voice data 42 and control signals 44 between communication platform 2 (through PBX network interface 38 via messaging and telephone line unit 39) and PBX equipment 36. The transfer of control signals 44 between communication platform 2 and PBX equipment 36 enables communication platform 2 to service telephone calls 45 destined for a PBX extension such as extension 14c. Depending on the control signals 44 received, communication platform 2 can either provide PBX-like services such as call forwarding, call conferencing, and the like, or direct voice-over-IP communication to other communication platforms (not shown) ultimately connected to switched backbone 4.

Note that additional single line telephone connections may be used, depending on the amount of voice traffic anticipated between PBX equipment 36 and communication platform 2.

In the preferred embodiment of the present invention, communication platform 2 is configured, through PBX network interface 38 and a set of API program modules, to receive and decipher control signals in the Inband format. The Inband format is an industry term that is commonly used to refer to control signals used by a variety of PBX equipment manufacturers to integrate their PBX equipment with a voice mail system. The ability of communication platform 2 to receive and decipher Inband formatted control signals enables it to be easily configurable with PBX equipment that have been designed to work with simple voice mail systems using control signals in the Inband format. There is no industry standard Inband format for these type of control signals. The Inband term is intended simply to refer to the type of control signals that are in the audio spectrum and hence, well-suited for transmission on telephone lines, such as single line telephone connection 40. DTMF signals are one set of Inband control signals that are commonly used.

As known in the art, a typical PBX generates control signals for each call that is forwarded to a voice mail system. The control signals include, among other things, the type of call being forwarded 46 (hereinafter, call type) and the PBX extension number 48 from which the call is being forwarded. By configuring communication platform 2 to be responsive to Inband control signals, which include call type 46 and the PBX extension number 48, it can be easily configured through API functions in a manner described herewith to service phone calls received from a PBX that was originally designed to be compatible with voice mail systems supporting Inband integration.

In the present invention, instead of automatically accepting a call received from a PBX for voice mail processing, communication platform 2 decipher's control signals 44 and uses the deciphered signals to determine how to service the call by accessing a configuration profile that corresponds to the call recipient's extension number. For example, if the called party had previously set his PBX extension to unconditionally forward a call to a target telephone number serviced by a remote communication platform, phone calls forwarded by PBX equipment 36 to communication platform 2, which indicate that they are forwarded calls from a PBX extension, are forwarded by communication platform 2 to a remote communication platform servicing the target telephone number as specified by the call recipient's configuration profile.

The call type 46 and PBX extension number 48 may be represented as a sequence of control signals separated by a pound sign (#), where a leading digit represents the type of call being forwarded to communication platform 2 from PBX equipment 36 and the following digits representing the PBX extension number from which the call is received. A leading digit of one (1) represents an incoming call that was forwarded from a PBX extension, while a leading digit of two (2) represents a direct call. A direct call in this context is defined as a call that is not forwarded from another PSTN network (or PBX extension) to communication platform 2 but a call that originates from a PBX extension (or a PSTN telephone) and is received directly by communication platform 2. Also, since control sequences in the Inband format are PBX dependent, communication platform 2 is not intended to be limited to the above sequence of control signals but includes additional program modules that are capable of deciphering control signals in other Inband formats that are used by typical PBX equipment, enabling communication platform 2 to be integrated with any PBX network that supports Inband integration.

Figure 1D:
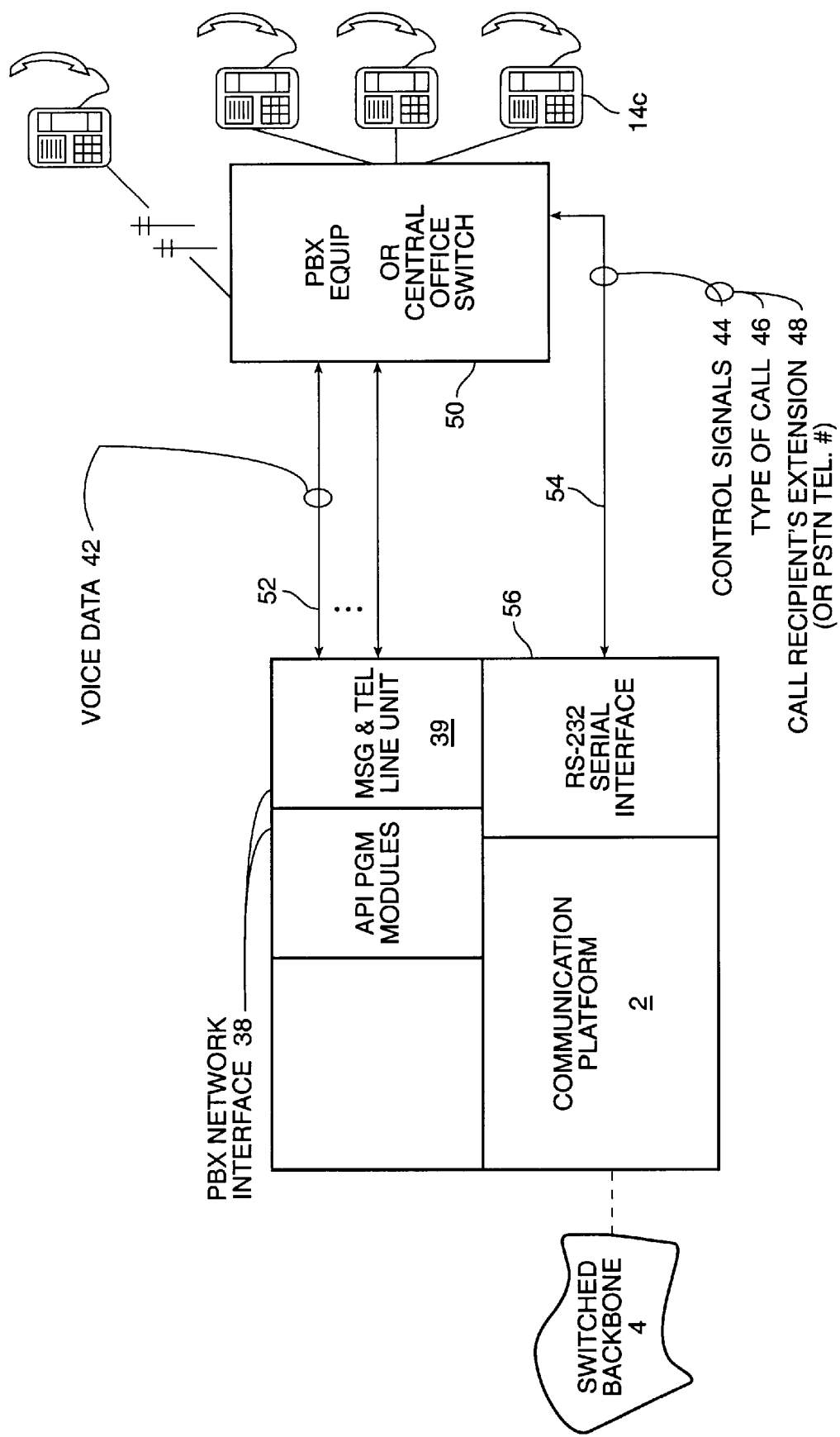
FIG. 1D is a block diagram of a communication platform integrated with PBX equipment that supports a large PBX network or central office switch in accordance with an alternative embodiment of the present invention.

FIG. 1D is a block diagram of a communication platform integrated with PBX equipment that supports a large PBX network or central office switch in accordance with an alternative embodiment of the present invention.

As known in the art, a large PBX network or central office switch may be integrated with simple voice mail systems using a SMDI (Simplified Message Desk Interface) protocol. The SMDI protocol is defined in the reference entitled, "Simplified Message Desk Interface (SMDI) Generic Requirements from BellCore, technical reference TR-NWT-00283, Issue 2, 1991, which is hereby incorporated by reference as if fully described herein. Integration through the SMDI protocol requires using separate transmission layers for voice data and control signals. Specifically, voice data may be transmitted between a central office switch or PBX equipment and a voice mail system using at least one single line telephone connection, a T1 trunk, or an E1 trunk, while control signals are transferred through a separate RS-232 serial line.

The present invention in the alternative embodiment, is also capable of supporting large PBX equipment 50 (or central office switch) which has a separate voice transmission line 52 and a separate control signal transmission line 54 for transmitting voice data and control signals. Voice data is passed between PBX equipment 50 (or central office switch) and communication platform 2 through voice transmission line 52, while control signals are transferred through control signal transmission line 54 such as a RS-232 serial line. This allows communication platform 2 to provide PBX-like features or voice-over-IP communication to phone calls forwarded from a PBX extension (or a PSTN telephone supported by a central office switch). The difference in this alternative embodiment with the preferred embodiment described above is that control signals passed to communication platform 2 are sent through a separate transmission line such as a RS-232 serial line. The control signals 44 are received by communication platform 2 through a serial interface 56 and are then deciphered and acted upon by API functions, or equivalent means within communication platform 2.

Like the control signals used in the Inband integration example described above, the SMDI protocol also provides for defining the type of call forwarded 46 and PBX extension number 48 (or a PSTN telephone number) from which the call was forwarded. This allows communication platform 2 to distinguish between the types of calls such as direct or forwarded calls. Each control signal includes a type of call character that represents the type of call being forwarded and additional digits representing the PBX extension number (or a PSTN telephone number) from which the call is received. A type of call character of "A" represents an incoming call that was unconditionally forwarded from a PBX extension (or a PSTN telephone number), while a type of call character of "D" represents a direct call.

Additional network interfaces may be included to support additional networks, separately or in conjunction with the described networks above by adding additional messaging and telephone line units and program modules that make appropriate API calls to the corresponding Dialogic boards.

Communication platform 2 manages the network interfaces and voice communication module 8, through program control so as to provide telecommunication services which include providing voice-over-IP communication between a first user and a second user and PBX-like features. Each user may be on different networks that are networked to the switched backbone via the network interfaces provided by the communication platforms connected to the global PBX.

For example, a user 12a connecting to communication platform 2 through PSTN 6 and telephone 14a, and requesting telecommunication services offered through a user interface provided by computer 22 which is running under program control. If user 12a seeks to obtain voice-over-IP communication over switched backbone 4 to call user 12b supported by communication platform 18, communication platform 2 switches the telephone call from telephone network interface 24 to voice communication module 8 using one available time slot on the SCSA bus. After the voice data is digitized and packetized, voice communication module 8 formats the voice data and sends the data to another voice communication module at communication platform 18.

The format of the voice data is dependent on the transport protocol used by the network chosen for delivering the voice data, as known in the art. In a preferred embodiment, the voice data is formatted under a TCP/IP protocol so that it can be transmitted via a switch backbone such as the Internet. Also, the communication platform may rely on a LAN card and router, as shown in FIGS. 1 and 2, for interfacing to a switched backbone via an intermediate network in the event that the communication platform is not directly networked to the switched backbone. The LAN card enables computer system 22 to send or receive packetized voice data on the intermediate network, as known in the art.

Each communication platform on the global PBX offers a variety of PBX-like features to users, including call holding, call transfer, call forwarding and call conferencing, which are described below, by virtue of using computer system 22 and software modules to control the various network interfaces, including voice communication modules. Each communication platform on the global PBX can also provide a message center feature which automatically takes messages for subscribers who are not available to answer live calls received through a voice communication module. Thus, this invention not only takes advantage of using the voice communication module to place long distance calls to virtually anywhere in the world at the cost of a local phone call rate, it also "links-up" practically any existing telephone (including extensions behind a PBX) into extensions of the global PBX. This provides worldwide coverage, while offering all standard PBX features to every user having access to a network that supports a standard telephone.

For example, a subscriber in San Francisco, Calif., can forward his telephone to another telephone in London, United Kingdom. Any live call received from switched backbone 4 that is destined for the subscriber's San Francisco telephone is automatically forwarded to the designated telephone number in London, England which is serviced by a communication platform.

Note that a subscriber is a communication platform user, such as a caller or call recipient that is serviced by a communication platform, who is authorized to receive communication platform services according to a configuration profile created for the subscriber.

Moreover, the communication platform having the designated telephone number in London, England may also have call forwarding specified so that the subscriber's telephone number is forwarded to another communication platform servicing another designated telephone number in another location, such as Rome, Italy. This type of sequential forwarding between more than one communication platform permits a subscriber to roam at a new location and still remain available to receive calls from the subscriber's original telephone number without having to reconfigure the original communication platform to call forward to the new telephone number from which the subscriber can be currently reached.

In a second aspect of the present invention, communication platform 2 may also provide telecommunication services that includes multimedia messaging services such as those described in the multimedia messaging invention and in the managing multimedia messaging invention.

Method Of Operation

Placing a Voice Call

Figure 2A:
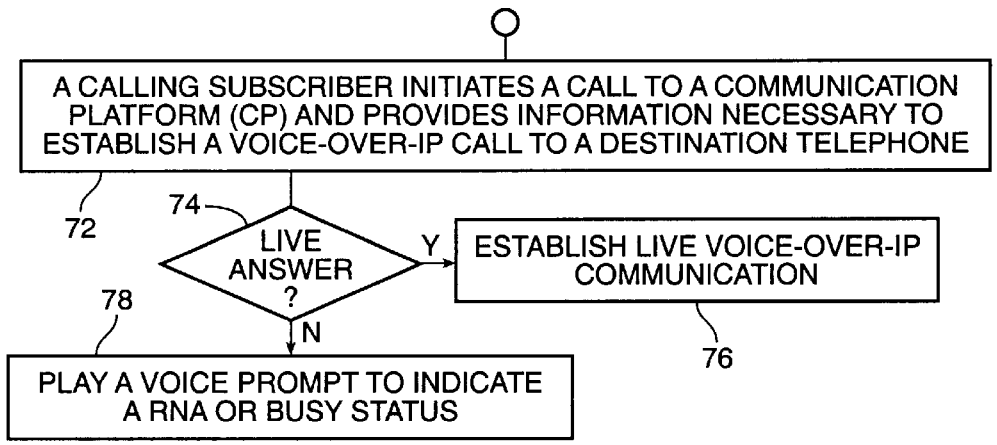
FIG. 2A is a flow diagram of the steps used to establish a voice call in accordance with a presently preferred embodiment of the present invention.

FIG. 2A is a flow diagram of the steps used to establish a voice call in accordance with a presently preferred embodiment of the present invention.

Figure 2B:
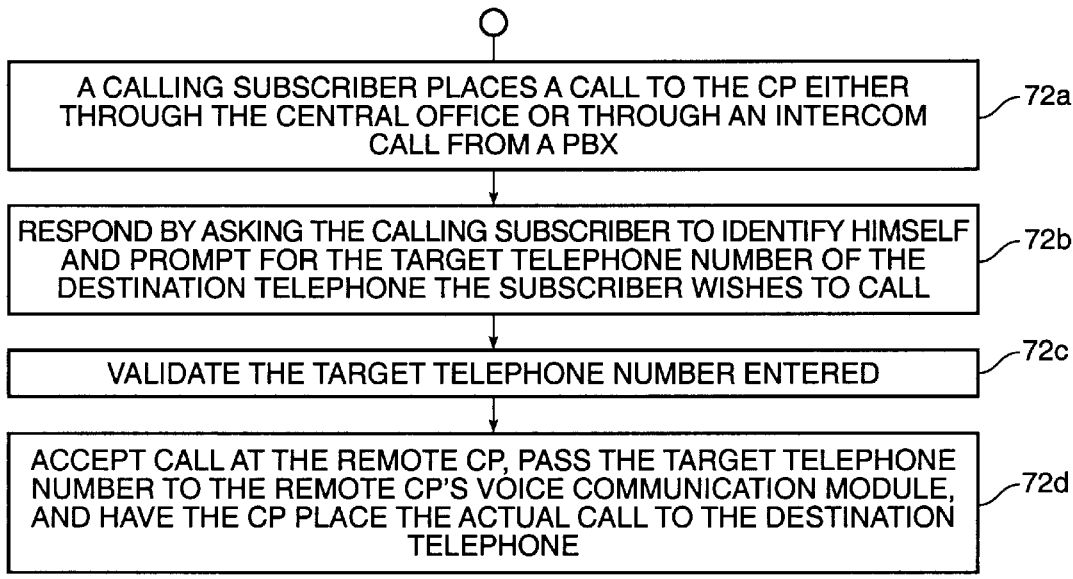
FIG. 2B is a flow diagram of the sub-steps used to establish a voice call session with a communication platform in accordance with a presently preferred embodiment of the present invention.

FIG. 2B is a flow diagram of the sub-steps used to establish a voice call session with a communication platform in accordance with a presently preferred embodiment of the present invention.

Figure 2C:
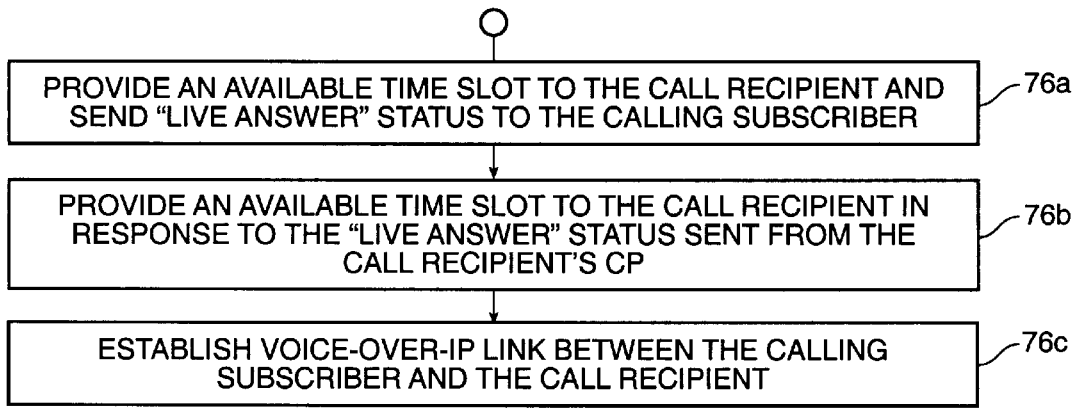
FIG. 2C is a flow diagram of the sub-steps used to establish a voice call session with a remote communication platform in accordance with a presently preferred embodiment of the present invention.

FIG. 2C is a flow diagram of the sub-steps used to establish a voice call session with a remote communication platform in accordance with a presently preferred embodiment of the present invention.

Turning to FIG. 2A at step 72, a user contacts a communication platform and provides information necessary to establish a voice call to another user serviced by the global PBX. The communication platform in turn, may be configured to: check whether the user is an authorized user (subscriber); provide directions to the subscriber by prompting; and establish a link with a destination communication platform when authorization is complete and valid. For example, turning to FIG. 2B, step 72 may further include the following sub-steps.

At step 72a, a subscriber places a call to a communication platform either routed through a PSTN central office, or through an intercom call from a PBX extension.

At step 72b, the communication platform answers and plays a voice prompt to ask the subscriber to identify himself, such as through a password or personal identification number (PIN) number and subscriber ID number, and log on. Data entry is through a standard telephone keypad that generates DTMF tones. Once the subscriber is logged on, the communication platform will prompt the subscriber to enter, via the telephone keypad, the telephone number which may include the country code, area code, and/or city code of the destination telephone the subscriber wishes to call.

At step 72c, communication platform 6 validates the telephone number entered and passes the number to voice communication module 8 through the internal memory of computer 22. Voice communication module 8 responds using an internal directory to place the call through switched backbone 4 to a voice communication module located within a remote communication platform that is designated to support a local calling area from which the destination telephone may be reached. This establishes a voice-over-IP link. A voice-over-IP link is a link that is established on a TCP/IP switched backbone between communication platforms that are capable of supporting voice communication using packetized voice data.

At step 72d, the voice communication module at the remote communication platform will accept the voice-over-IP link, pass the telephone number to the communication platform computer through the computer's internal memory, and have the communication platform place the actual call to the destination telephone.

Returning to FIG. 2A, if in step 74 the communication platform in the remote communication platform determines by call progress analysis that the destination telephone number is answered by a live person (call recipient), then step 76 is performed. Otherwise step 78 is performed.

Call progress analysis is a process by which a communication platform determines the status of a telephone line after making an outbound telephone call or after establishing a connection with a another party. Call progress analysis utilizes techniques in frequency detection and cadence (the on and off duration of an audio signal) detection to determine if an outbound call is answered by a live person, ring-no-answer signal or busy signal. For example, after establishing a telephone connection a communication platform can use call progress analysis to determine if the other person has hung-up the phone by detecting disconnect tones sent from a central office or a PBX. In the preferred embodiment of the present invention, call progress analysis is performed using call progress analysis tools available from Dialogic Corporation of Parsippany, N.J., having model designation, "CPC" or "Perfect Call".

At step 76, the remote communication platform will send an internal command indicating a live answer status via the communication platform's internal memory to its voice communication module so that the voice-over-IP link may be established for live communication.

Step 76, as shown in FIG. 2C, may include the following sub-steps. At step 76a, the call recipient's voice communication module switches on the call recipient with an available time slot on the SCSA bus which it shares with its communication platform when the call recipient answers the telephone call, and sends a packet of information indicating live answer status to the caller's voice communication module through the voice-over-IP link over the switched backbone such as the Internet.

At step 76b, upon receiving the packet indicating a live answer status, the caller's voice communication module sends an internal command indicating a live answer status to the caller's communication platform via the communication platform's memory. The caller's voice communication module switches on the caller with an available time slot on the SCSA bus which it shares with its communication platform.

At step 76c, the caller and the call recipient are connected via the following links:

(1) the caller is connected from a telephone network interface, which is located in the caller's communication platform, to the caller's voice communication module through their respective SCSA buses;

(2) the caller's voice communication module is connected to the call recipient's voice communication module over the switched backbone, establishing a voice-over-IP link; and (3) the call recipient is connected via a time slot from the call recipient's communication platform (through a telephone network interface) to the call recipient's voice communication module.

If at step 74, the remote communication platform determines by call progress analysis that the destination telephone number is not answered by a call recipient but instead receives a ring-no-answer (RNA) status or busy status, then step 78 is performed.

At step 78, the remote communication platform will send an internal command indicating a RNA or busy status to the voice communication module via the communication platform's internal memory. The call recipient's voice communication module sends a packet of information indicating "ring-no-answer" or "busy" status to the caller's voice communication module over the switched backbone. Upon receiving this packet, the caller's voice communication module will send an internal command indicating a RNA or busy status to the communication platform via the communication platform's internal memory. The caller's communication platform will play a voice prompt to the calling subscriber that the call cannot be completed because of a RNA or busy status.

Putting a Caller on Hold

Figure 3:
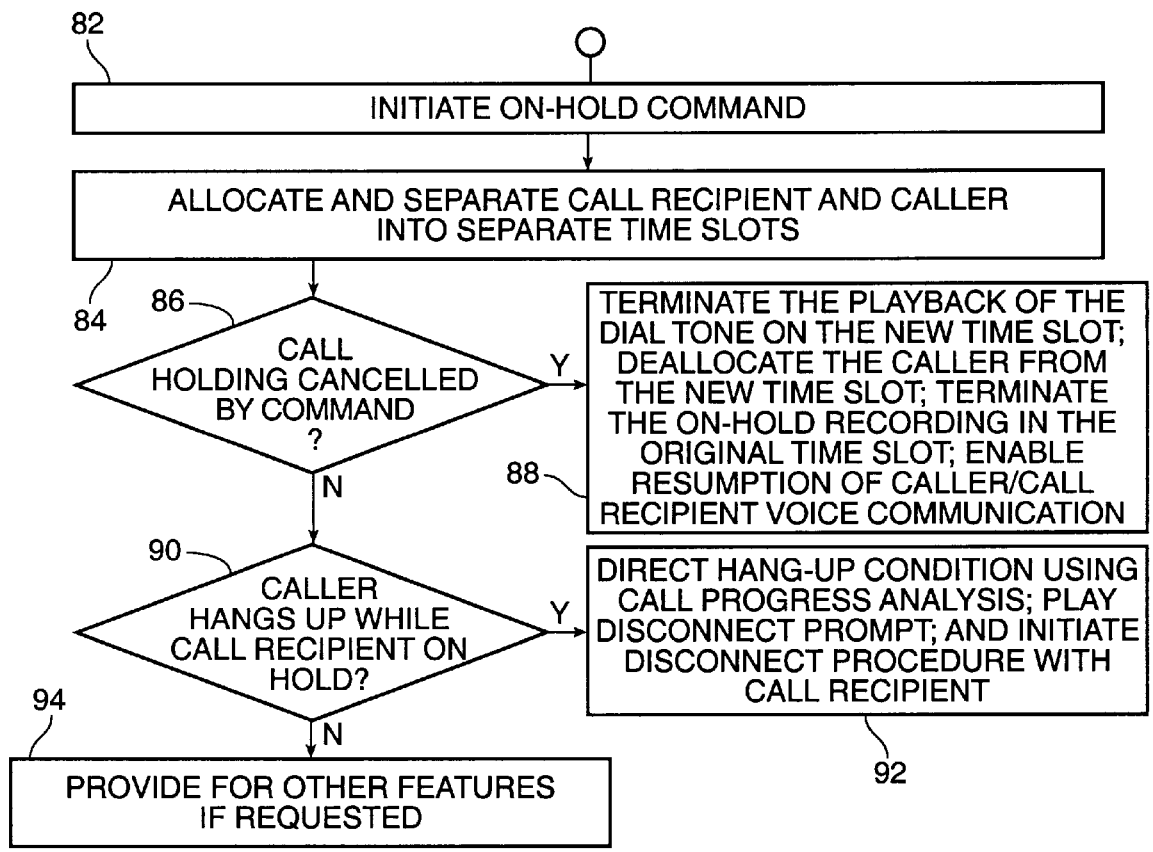
FIG. 3 is a flow diagram of the steps used to put a call recipient on-hold in accordance with a presently preferred embodiment of the present invention.

FIG. 3 is a flow diagram of the steps used to put a call recipient on-hold in accordance with a presently preferred embodiment of the present invention.

When a telephone connection between two communication platforms is established between a caller and a call recipient as described in the section "Placing a Voice Call" described above, the caller can put the call recipient on-hold and place a new call.

At step 82, the caller places a call on-hold by depressing a touch-tone digit or a string of touch-tone digits on his telephone keypad to signal the initiation of call holding. The string of touch-tone digits may be of any pre-configured variation so long as the string permits the communication platform to distinguish from other strings or digit that represent other commands.

At step 84, the caller's communication platform detects the call holding command digit(s) that were pressed and recognizes that a "call holding" request has been issued. In response, the caller's communication platform connects the SCSA bus time slot allocated for the caller and call recipient ("original time slot") to a new time slot. The new time slot may be a time slot playing a music-on-hold recording or any other pre-recorded recording so as to indicate to the call recipient that the call recipient is on. hold.

In addition, the caller is deallocated from the original time slot and assigned an available time slot on the SCSA bus. The communication platform may also be configured to play an on-hold prompt which is followed by a dial tone after the new time slot has been allocated to the caller. The dial tone will be played indefinitely until either call holding is canceled or the caller hangs up. The caller can, at this point, dial another telephone number if call transfer or conferencing is desired. See the next section "Transferring or Conferencing a Call" for details.

At step 86, if call holding is canceled by command, step 88 is performed. The cancellation of call holding may be initiated by having the caller depress a pre-configured touch-tone digit or a string of touch-tone digits on his telephone keypad.

At step 88, the caller's communication platform detects the call holding cancellation digit(s), terminates the playback of the dial tone on the new time slot, deallocates the caller from its new time slot, terminates the playing of music-on-hold recording or any other pre-recorded recording on the original time slot, if any, and reconnects the caller to the call recipient via the original time slot. The caller and call recipient can then resume communication.

If at 86, call holding is not canceled by command, step 90 is performed. At step 90, if the caller hangs up the telephone while the call recipient is on-hold, step 92 is performed. At step 92, the caller's communication platform will detect the hang up condition through call progress analysis. The caller's communication platform will then terminate the playing of music-on-hold recording or any other pre-recorded recording on the original time slot, if any, and play a disconnect prompt such as, "[w]e're sorry, this call will be disconnected because the caller has already hung up," to the call recipient. The caller's communication platform will send a command via the communication platform's internal memory indicating a hang-up status to its voice communication module, which will initiate a disconnect procedure with the call recipient's voice communication module.

If at step 90, the caller does not hang up while the call recipient is on-hold, step 94 is performed. At step 94, the caller may resume communication by performing step 88 or initiate other features such as call transferring or call conferencing, as described below.

Transferring or Conferencing a Call

Figure 4:
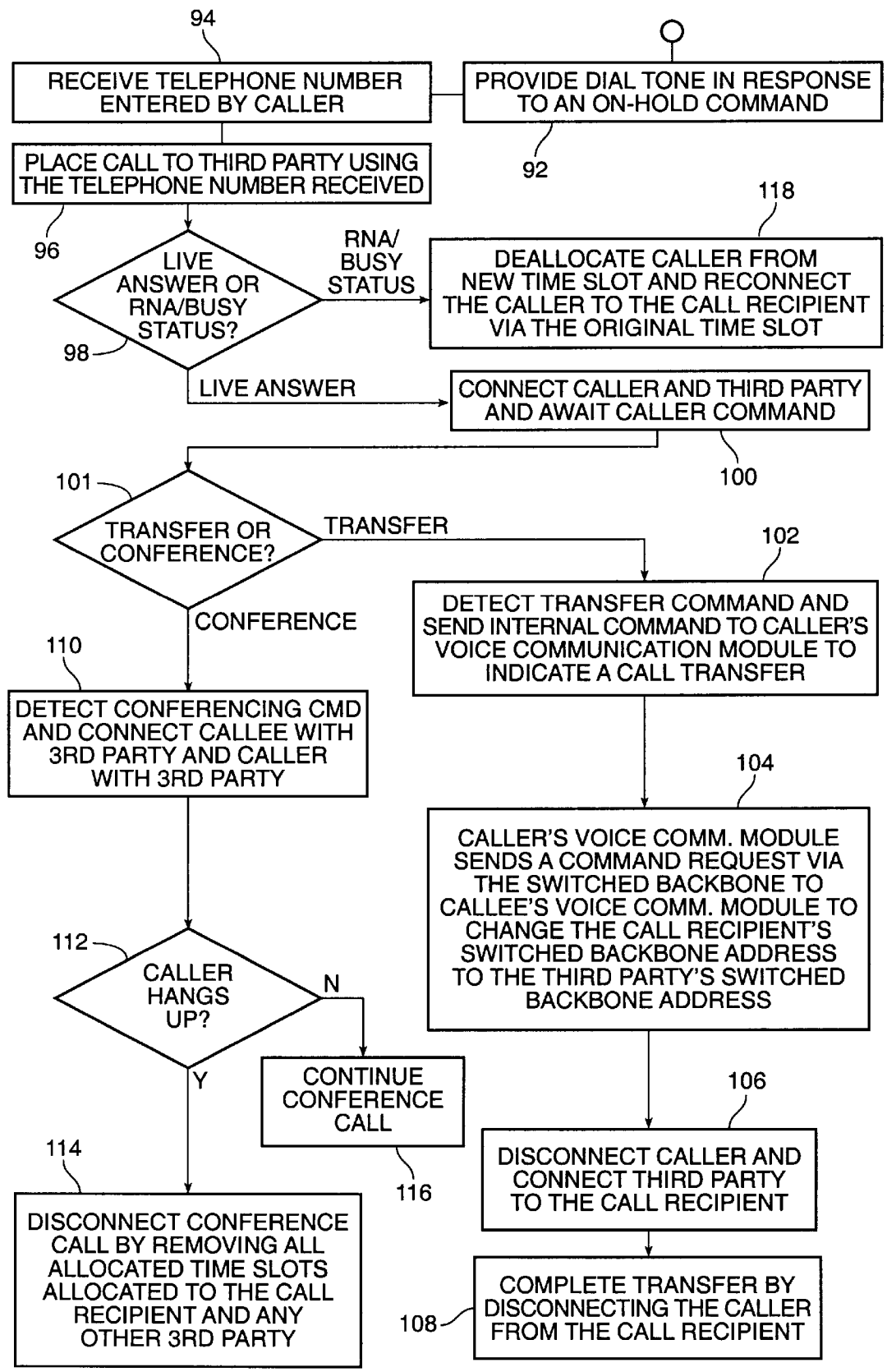
FIG. 4 is a flow diagram of the steps used to establish call transferring or call conferencing in accordance with a presently preferred embodiment of the present invention.

FIG. 4 is a flow diagram of the steps used to establish call transferring or call conferencing in accordance with a presently preferred embodiment of the present invention.

When a telephone connection between two communication platforms is established between a caller and a call recipient as described in the section "Placing a Voice Call" described above, the caller can transfer the call recipient to a third party (call transferring) or add one or more third parties to the conversation (call conferencing) as follows.

At step 92, the caller puts the call recipient on hold by executing steps 82 and 84, as described in the section "Putting a Caller on Hold" above. This results in a dial tone.

At step 94, the caller dials the telephone number, such as the country code, area code, and/or city code of the third party where the call is to be transferred or to be established for conferencing.

At step 96, the caller's communication platform detects and collects the digits of the telephone number dialed by the caller and places a call to the third party in a procedure that includes steps 72c through 72d, as described in the section "Placing a Voice Call".

Live Answer

At step 98, if the status of the third party line is a "live answer," step 100 is performed. Otherwise, step 118 is performed if the status of the third party call is RNA or busy. A "live answer" is defined as a state where the voice communication call is answered by a recipient rather than returned with an RNA or busy signal.

At step 100, the caller and the third party are connected, and the communication platform waits for a call transferring or call conferencing command from the caller. The call transferring or call conferencing commands may be a predetermined digit or a string of digit(s).

Call Transferring

At step 101, if the digit(s) caller enters correspond to a "call transfer" command, the caller's communication platform performs step 102.

At step 102, the caller's communication platform detects and recognizes this command request, and sends an internal command indicating the call transfer request via its internal memory to the caller's voice communication module.

At step 104, the caller's voice communication module sends a packet of information to the call recipient's voice communication module over the switched backbone. This packet of information contains a command request to change the voice communication module's currently active switched backbone address of the call recipient, such as an Internet IP address, which was originally the voice communication module's switched backbone address of the caller, to the third party's switched backbone address.

At step 106, the call recipient's voice communication module disconnects the switched backbone connection with the caller; and establishes the voice connection with the voice communication module of the third party over the switched backbone.

At step 108, call transfer is completed when the caller's voice communication module receives the disconnect status from the call recipient's voice communication module over the switched backbone and responds by disconnecting the caller by sending an internal command indicating the disconnect status via the internal memory to its communication platform, while establishing the connection between the call recipient and the third party.

Call Conferencing

If at step 101, the digit(s) caller enters correspond to a "call conference" command, step 110 is performed. At step 110, the caller's communication platform will detect and recognize this command request and connects, by executing a Dialogic SCSA bus command, time slots between the caller's communication platform and the call recipient's communication platform, and the connection between the caller's communication platform and the third party's communication platform. This connects the caller, call recipient and third party via the caller's communication platform and completes call conference. Additional parties can be added in the same described manner.

With the exception of the original caller, any other party on the conference call can disconnect from the conference call by hanging up. The communication platform of the party who has just hung up will automatically detect this condition by call progress analysis and will inform its voice communication module by sending an internal command indicating the hang-up status via the computer' memory. This party's voice communication module will send a packet of information indicating the hang-up status to the caller's voice communication module over the switched backbone, such as the Internet. Upon receiving this packet, the caller's voice communication module will send an internal command indicating the hang-up status as well as the identification number of the hung-up party via the computer's memory to the caller's communication platform. The caller's communication platform will then remove the time slot on the SCSA bus originally allocated for the hung-up party. All other parties can continue to communicate without interruption.

At step 112, if the original caller hangs up, step 114 is performed by disconnecting the conference call. Otherwise, step 116 is performed.

At step 114, the original caller initiates the disconnect by hanging up the telephone. The caller's communication platform, through call progress analysis, detects and recognizes the hang-up condition. The caller's communication platform sends an internal command indicating hang-up status to the caller's voice communication module via the computer's internal memory. The caller's communication platform also immediately disables the talk paths of all other parties by removing their allocated time slots from the caller's communication platform SCSA bus. At the same time, the caller's voice communication module sends a packet of information indicating hang-up status to each of the parties whose voice communication connections are still active. Upon receiving this packet, voice communication module of each of the other parties will disconnect the voice communication call and send an internal command to its communication platform via the PC's internal memory. Its communication platform will play a disconnect prompt which may be any prompt indicating to a call recipient or a third party that the connection has been terminated.

At step 114, if the caller does not hang-up, conferencing calling continues between the connected parties.

Ring-No-Answer or Busy:

If at step 98, the caller is informed by its communication platform via an appropriate voice prompt that the call to the third party was returned with a RNA or busy status, as described in the section "Placing a Voice Call" above, step 118 is performed.

At step 118, the caller's communication platform deallocates the caller from its new time slot, and reconnects the caller to the call recipient via the original time slot. The caller and call recipient can then resume communication, if desired.

Forwarding a Call

A subscriber can forward his telephone number to a target telephone number located anywhere in the world as long as the telephone number is within an area serviced by a communication platform. After call forwarding is established, voice-over-IP calls destined for the subscriber's original telephone will be automatically rerouted to the forwarded telephone. Forwarding can also be used to activate a message mailbox, such as voice mailbox or a fax mailbox, which are provided by a communication platform as described in the multimedia messaging invention. When call forwarding to a message mailbox is chosen, voice communication calls destined for the subscriber's original telephone will be rerouted to the subscriber's message mailbox according to conditions picked by the subscriber. For example, incoming calls receiving a busy signal are automatically forwarded to the subscriber's mailbox ("busy forward condition").

Alternatively, the subscriber may elect to have all voice-over-IP calls directed to message mailbox provided by another communication platform from which the subscriber has obtained a message mailbox. For example, if a subscriber in San Francisco, Calif. anticipates being at a remote location such as Taipei, Taiwan, the subscriber can unconditionally forward ("unconditionally forward condition") all calls to the subscriber's communication platform in San Francisco to the message mailbox provided by the remote communication platform in Taipei.

Note that a subscriber is a communication platform user, such as a caller or call recipient that is serviced by a communication platform, who is authorized to receive communication platform services according to a configuration profile created for the subscriber.

Figure 5A:
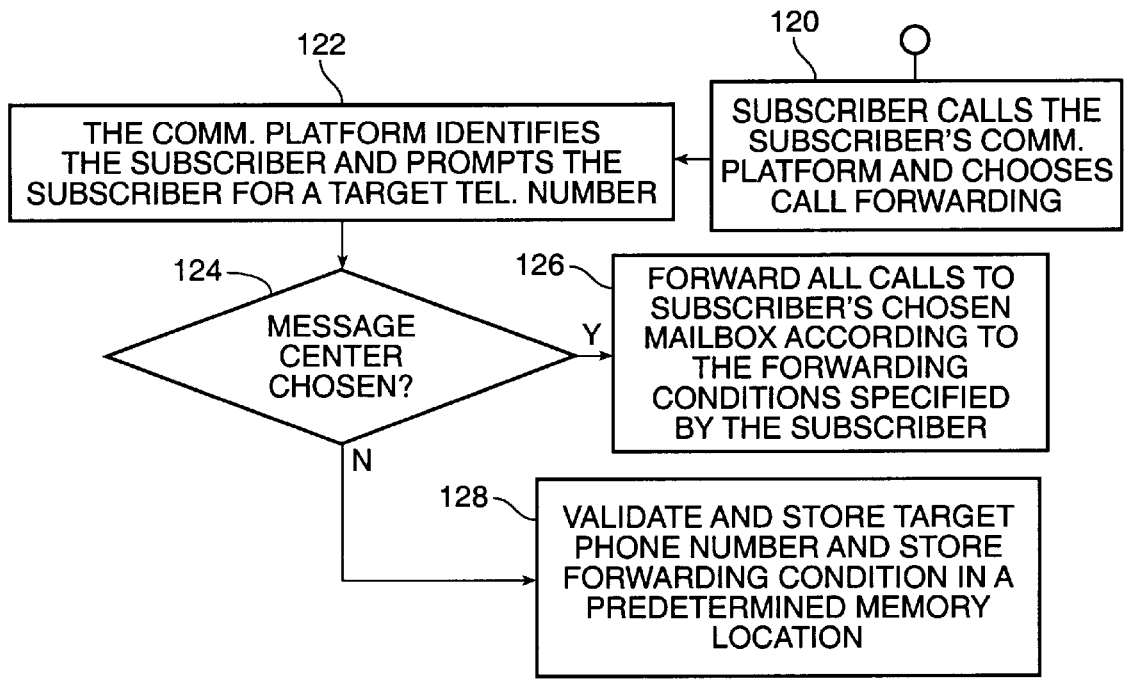
FIG. 5A shows the steps for configuring a communication platform for call forwarding an incoming call to any telephone located anywhere in the world or to a selected mailbox in accordance with a presently preferred embodiment of the present invention.

FIG. 5A shows the steps for configuring a communication platform for call forwarding an incoming call to any telephone located anywhere in the world or to a selected mailbox in accordance with a presently preferred embodiment of the present invention.

At step 120, a subscriber places a call to the his communication platform, either through a PSTN central office or an intercom call from a PBX.

At step 122, the communication platform within the subscriber's communication platform answers and plays a voice prompt to ask the subscriber to identify himself (through a password or PIN number and subscriber ID number) and log on. Data entry is accomplished through a keypad generating DTMF tones, such as a standard telephone keypad. Once the subscriber is logged on, he can select the appropriate menu option to configure his extension or telephone number for call forwarding. Once call forwarding is selected, the communication platform prompts the subscriber to enter a target telephone number for which calls directed to the subscriber's extension will be forwarded. In response, the subscriber enters the target telephone number and any necessary prefix codes such as the country code, area code, city code, via the telephone keypad.

At step 124, if the subscriber also enters a predetermined digit or string of digits to obtain "message center" services, step 126 is performed. For example, "000" could be used to represent the target telephone number for "message center," although any digit or string of digits may be chosen so long as the chosen digit or string can be adequately distinguished from other commands entered through the telephone keypad.

At step 126, the subscriber may further specify (via additional keypad digit entries) the call forwarding conditions: busy forward, ring-no-answer forward or unconditional forward. All incoming calls will be then directly forwarded to the subscriber's mailbox (i.e., the caller will hear the subscriber's personal greeting and be prompted to leave a voice or fax message) according to the forwarding conditions specified by the subscriber.

If at step 124, the subscriber does not initiate the message center service, step 128 is performed. At step 128, the subscriber's communication platform validates the target telephone number entered by checking the directory and ensuring that the target telephone number may be reached through of one of the communication platforms. The subscriber's communication platform enters the target telephone number and forwarding condition chosen into a predetermined memory location accessible by voice communication module in the subscriber's communication platform.

Figure 5B:
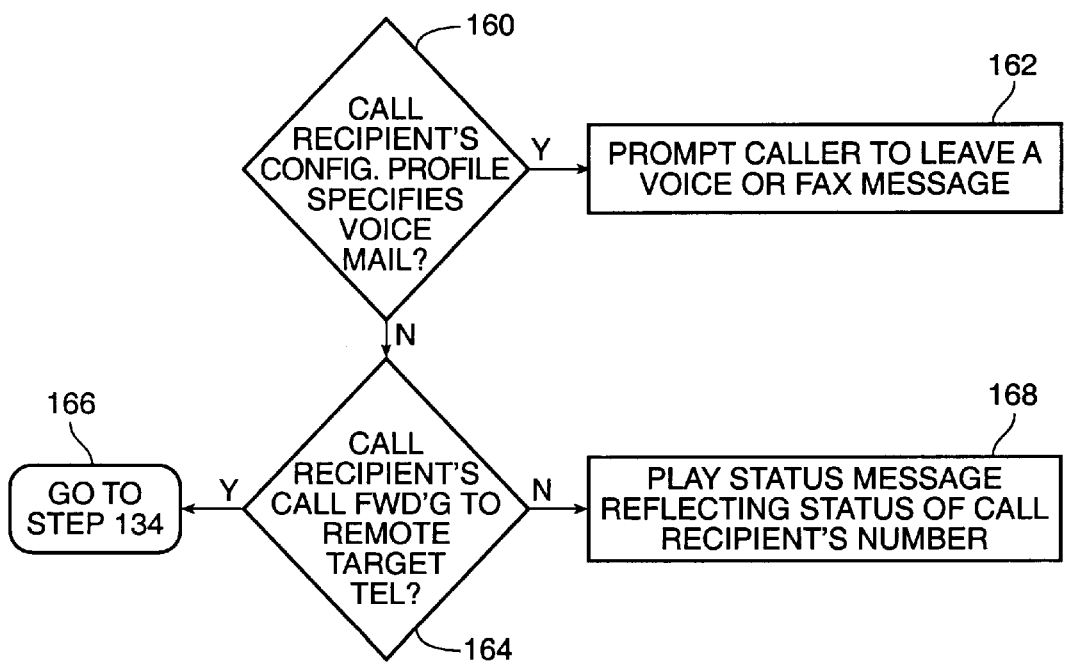
FIG. 5B shows the steps for providing two levels of call forwarding in accordance with a presently preferred embodiment of the present invention.
Figure 5B:
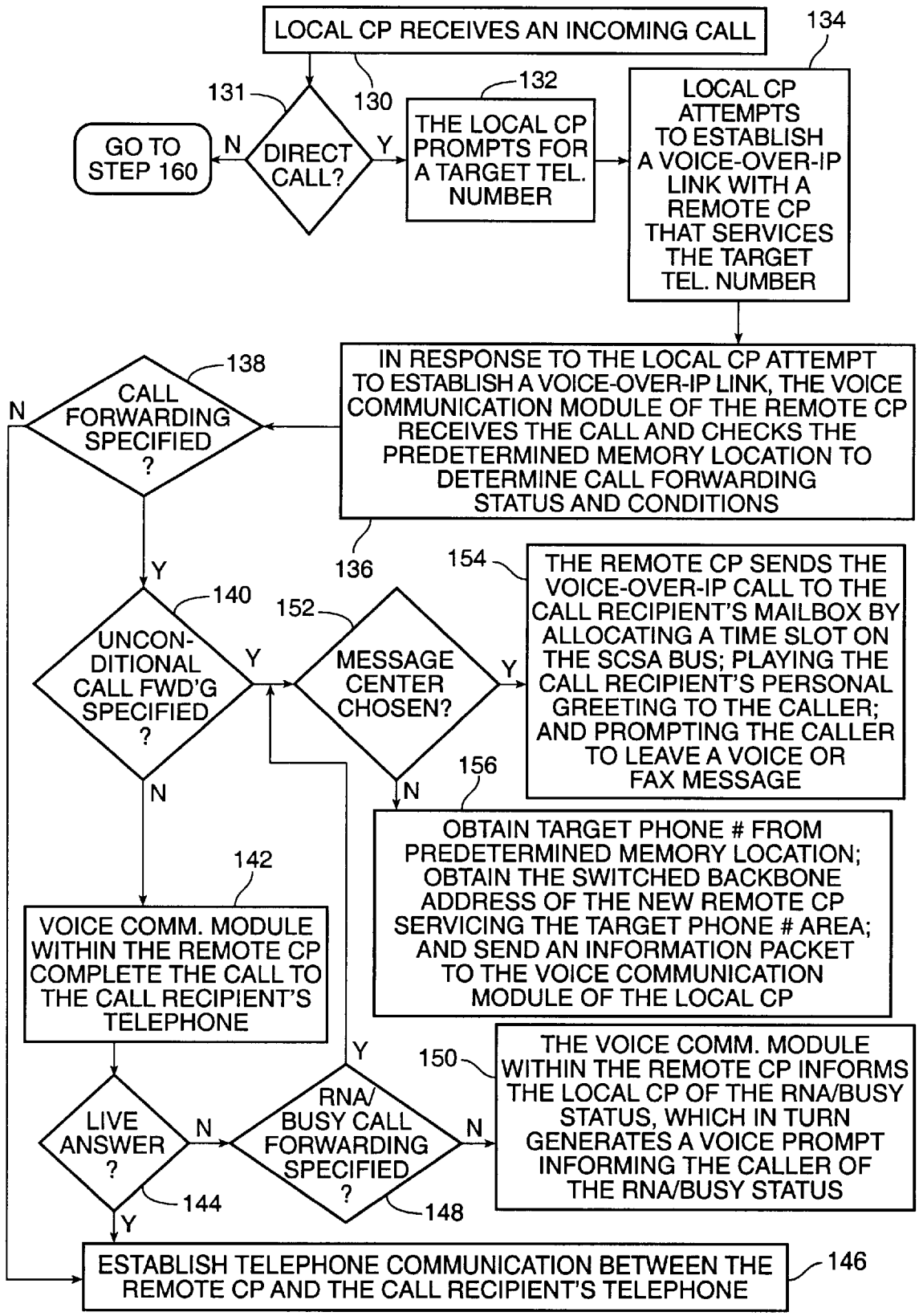

FIG. 5B shows the steps for providing two levels of call forwarding in accordance with a presently preferred embodiment of the present invention.

At step 130, a local communication platform receives an incoming telephone call through its PBX network interface. As discussed in the apparatus section above, each call from a PBX includes control signals that are received by the local communication platform. The local communication platform deciphers the control signals to obtain the call type and the PBX extension number that corresponds to the call received from the PBX.

At step 131, the local communication platform checks the call type to determine whether the call received from the PBX is a direct call. If so, it performs step 132.

At step 132, the local communication platform prompts the caller for a target telephone number.

At step 134, the local communication platform locates a remote communication platform servicing the target telephone number and establishes a voice-over-IP link with the remote communication platform. The local communication platform locates the remote communication platform by correlating the target telephone number in an internal directory with a switched backbone address ("target address") of the remote communication platform, such as an IP address. The voice communication platform within the local communication platform then sends an information placket containing the target address and the target telephone number to the remote communication platform through a switched backbone upon which both communication platforms are networked.

At step 136, the voice communication module of the remote communication platform receives the incoming voice-over-IP link and checks the predetermined memory location as described in step 128 above.

At step 138, if the predetermined memory location indicates that call forwarding is specified, step 140 is performed.

At step 140, if the predetermined memory location indicates that unconditional call forwarding is not specified, step 142 is performed.

At step 142, the remote voice communication module and communication platform together attempt to complete the call to the call recipient's telephone as described in the section "Placing a Voice Call" above, except for the following differences described in steps 144 through 148.

At step 144, if through call progress analysis the remote communication platform determines that the call results in a live answer status, step 146 is performed.

At step 146, the remote communication platform establishes voice communication between the call recipient's telephone and the local communication platform, as described in steps 76a–76c in the section, "Placing a Voice Call" above.

If at 144, through call progress analysis the remote communication platform receives a ring-no-answer or busy status rather than a live answer status, step 148 is performed.

At step 148, if the predetermined memory location indicates that ring-no-answer forward or busy forward is not specified, step 150 is performed.

At step 150 the remote communication platform informs the local communication platform of the ring-no-answer or busy status. The local communication platform responds by performing step 78 in the section, "Placing a Voice Call" above. This results in the local communication platform playing a voice prompt which indicates to the caller that the attempted voice-over-IP call to the call recipient returned with an RNA/busy status.

If at step 148, ring-no-answer forward or busy forward is specified, then step 152 is performed. At step 152, the remote communication platform determines whether the call recipient had chosen the message center feature and if so, step 154 is performed.

At step 154, the voice communication module within the remote communication platform allocates a time slot on its voice communication module and telephone network interface SCSA bus and immediately play the call recipient's personal greeting to the caller over the allocated time slot. After the call recipient's personal greeting is finished playing, the caller will be prompted to leave a voice or fax message.

If at step 152, the call recipient had not specified "message center", step 156 is performed. At step 156, the voice communication module within the remote communication platform looks up a new target telephone number in an internal directory and determines the switched backbone address ("target address"), such as an IP address, of a new remote communication platform that services the new target telephone number. The voice communication module within the remote communication platform then sends an information packet containing the target address and the new target telephone number to the local communication platform which is received by its voice communication module. Upon receiving the packet, the voice communication module within the local communication platform will abandon the current voice-over-IP link and initiate a new voice-over-IP link with the new remote communication platform servicing the new target telephone number.

If at step 140, unconditional call forwarding is specified, step 152 is performed. If at step 152, if the subscriber had specified "message center" as the target telephone number, step 154 is performed. Otherwise 156 is performed.

If at step 138, call forwarding is not specified, step 146 is performed. At step 146, the remote communication platform completes the voice-over-IP call as described in step 72*d* above.

If at step 131, the incoming call is a forwarded call, step 160 is performed. The communication platform uses the PBX extension number, which was deciphered by the local communication platform in step 130, to determine how to service the incoming telephone call by accessing the configuration profile previously selected by the call recipient associated with the PBX extension number. As described in the apparatus section, the call type is received before the PBX extension number with each control signal separated by a pound sign (#).

The communication platform is not intended to be limited to the above sequence of control signals but includes additional program modules that are capable of deciphering control signals in an Inband format that are used by typical PBX equipment, enabling the communication platform to be integrated with a PBX network or Central Office that supports Inband integration or SMDI integration.

At step 160, if the configuration profile specifies that the call forwarded from the deciphered PBX extension number is to be serviced through voice mail, step 162 is performed.

At step 162, the caller is prompted by the communication platform to leave a voice or fax message.

If at step 160, the configuration profile does not specify voice mail services, then step 164 is performed.

At step 164, the local communication platform through program control checks the configuration profile to determine whether call forwarding to a target telephone number was specified. If so, step 166 is performed.

At step 166, the local communication platform obtains the target telephone number from the configuration profile and returns to step 134.

If at step 168, the configuration profile does not specify call forwarding to a remote target telephone number, then the local communication platform plays a status message to the caller that reflects the status of the PBX extension. For example, if the PBX extension is currently in use, a busy tone or busy message is played for the caller.

Note that the above steps assume that the local communication platform receives telephone calls that are either received by a PBX and forwarded to the local communication platform, or directly dialed from an extension within the PBX to the local communication platform. In this scenario, the PBX and the local communication platform, which uses a PBX network interface, communicate through control signals using either an Inband format or SMDI protocol, as discussed in the apparatus section above.

However, in an alternative embodiment of the present invention, the local communication platform may be integrated with a central office switch through the SMDI protocol which allows the communication platform to also service direct or forwarded calls from the central office switch in the manner discussed in steps 130 through 168.

The above call forwarding method describes call forwarding from a subscriber's communication platform to another communication platform which services an area that supports the target telephone number (single hop call forwarding). The present invention does not restrict call forwarding to single hop call forwarding but permits the communication platform servicing the target telephone number to also be configured to forward the voice-over-IP call to another communication platform serving another target telephone number.

The chain of communication platforms forwarding a voice-over-IP call from one communication platform to the next will continue until a communication platform exists in the chain that is not configured for call forwarding, enabling a subscriber to receive a voice-over-IP call that was forwarded sequentially through more than one communication platform. This permits a subscriber to roam at a new location and still be available to receive calls from the subscriber's original telephone number without having to reconfigure the original communication platform to call forward to the new telephone number from which the subscriber can be currently reached.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A system for providing private branch exchange services, comprising:
   a first communication platform coupled to a first network and a second network, said first communication platform providing private branch exchange services in response to a request received from said first network;
   a second communication platform coupled to said first network and a third network, said second communication platform providing private branch exchange services in response to a request received from said first network;
   wherein said first communication platform and said second communication platform each include a voice communication module and a communication platform for managing said voice communication module so as to provide said private branch exchange services, said private branch exchange services including providing substantially real-time voice communications between a first caller connecting to said first communication platform through said second network and a second caller connecting to said second communication platform through said third network; and
   wherein said first communication platform and said second communication platform each include software designed to detect private branch exchange service requests and subsequently exchange a plurality of signals between said first communication platform and said second communication platform for executing said private branch exchange services in response to said private branch exchange service requests.

2. The system in claim 1, wherein said first network is a switched communications backbone.

3. The system in claim 1, wherein said first network is the Internet.

4. The system in claim 1, wherein said second network is a private branch exchange network.

5. The system in claim 1, wherein said third network is a public switched telephone network.

6. The system in claim 1, wherein data communication between said communication platform and said voice communication module is accomplished through a memory store.

7. The system in claim 1, wherein said communication platform and said voice communication module are internally connected to provide voice communication through a signal computing system architecture bus.

8. The system in claim 1, wherein said private branch exchange services include call forwarding to a third communication platform, said third communication platform coupled to said first network.

9. The system in claim 8, wherein said private branch exchange services include call forwarding from said third communication platform to a fourth communication platform, said fourth communication platform coupled to said first network.

10. The system in claim 1, wherein said private branch exchange services include call holding.

11. The system in claim 1, wherein said private branch exchange services include call transfer.

12. The system in claim 1, wherein said private branch exchange services include call conferencing with a third party serviced by a third communication platform coupled to said first network.

13. The system in claim 1, wherein said private branch exchange services are offered to a caller by using interactive voice prompting.

14. The system in claim 1, wherein said private branch exchange services include providing a voice status.

15. The system in claim 1, wherein said private branch exchange services include a messaging service.

16. The system in claim 15, wherein said messaging service is provided by said second communication platform in response to a status signal returned by a target telephone serviced by said second communication platform through said third network, said second communication platform calling said target telephone in response to a voice-over-IP link request from said first communication platform.

17. The system in claim 16, wherein said status signal includes a busy signal.

18. The system in claim 16, wherein said status signal includes a ring-no-answer signal.

19. The system in claim 1, wherein said private branch exchange services include a call forwarding service.

20. The system in claim 19, wherein said call forwarding service is provided by a third communication platform in response to a busy signal at said target telephone number.

21. The apparatus in claim 1, wherein said first communication platform further includes a private branch exchange network interface that is managed and controlled by said computer system through program control, said program control established by using modules that make Application Program Interface (API) calls to a programming interface, so that said first communication platform can send and receive telephone calls through said voice communication module from extensions defined within a private branch exchange network.

22. The system in claim 21, wherein said second network is a private branch exchange network managed by private branch exchange equipment, said first communication platform responsive to control signals generated by said private branch exchange equipment.

23. The system in claim 22, wherein said first communication platform forwards an incoming call from said private branch exchange network to said second communication platform in response to control signals describing said incoming call as a forwarded call.

24. The system in claim 23, wherein said control signals describe said incoming call by a call type and a phone number from which said incoming call was sent.

25. The system in claim 22, wherein said first communication platform provides voice mail services to an incoming call from an extension within said private branch exchange network in response to control signals describing said incoming call as a forwarded call and said extension having a corresponding configuration profile that dictates that all calls from said extension are to be forwarded to voice mail.

26. The system in claim 22, wherein said first communication platform forwards an incoming call from said private branch exchange network to said second communication platform in response to control signals describing said incoming call as a forwarded call, wherein said second communication platform services a remote target telephone number provided by a configuration profile, said configuration profile corresponding to a call recipient of said incoming call.

27. The system in claim 22, wherein said first communication platform forwards an incoming call from said private branch exchange network to said second communication platform in response to control signals describing said incoming call as a direct call, wherein said second communication platform services a remote target telephone number provided by a caller that generated said incoming call.

28. The system in claim 1, wherein said first communication platform further includes a public switched telephone network interface that is managed and controlled by a computer system through program control, said program control established by using modules that make API calls to a programming interface, so that said first communication platform can send and receive telephone calls through said voice communication module from a public switched telephone network.

29. The system in claim 28, wherein said second network is a public switched telephone network managed by a central office switch, said first communication platform responsive to control signals generated by said central office switch.

30. The system in claim 1, wherein said first communication platform provides private branch exchange services in response to a request received from said second network.

31. The system in claim 1, wherein said second communication platform provides private branch exchange services in response to a request received from said third network.

32. An apparatus for providing private branch exchange services on a switched wide area network, the apparatus comprising:

a communication platform having a computer system having an internal memory operating under program control and a telephone network interface, said telephone network interface responsive to telephone calls received from a telephone network;

a voice communication module coupled to said computer and said telephone network interface, and responsive to voice communication commands received from said communication platform so that telephone calls received from said telephone network can be switched to said voice communication module for transmission to another communication platform, said telephone network interface and said voice communication module coupled through a communications bus; and wherein said communication platform includes software designed to detect private branch exchange service requests and subsequently exchange a plurality of signals with another communication platform for executing said private branch exchange services in response to said private branch exchange service requests.

33. The apparatus in claim 32 wherein said telephone network interface is configured to respond to data transmitted by a caller using a telephone keypad, said telephone network interface responsive to said data by passing said data to said voice communication module through an internal memory of said computer system.

34. The apparatus in claim 32, wherein said communication platform further includes a LAN interface.

35. The apparatus in claim 32, wherein said communication platform further includes a private branch exchange network interface that is managed and controlled by said computer system through program control, said program control established by using modules that make API calls to a programming interface, so that said communication platform can send and receive telephone calls through said voice communication module from extensions defined within a private branch exchange network.

36. The apparatus in claim 35, further including means for responding to control signals generated by private branch exchange equipment managing said private branch exchange network, said private branch exchange network interface networked to said private branch exchange equipment.

37. The apparatus in claim 36, wherein said communication platform includes a means for forwarding an incoming call from said private branch exchange network to a second communication platform in response to control signals describing said incoming call as a forwarded call.

38. The apparatus in claim 37, wherein said control signals describe said incoming call by a call type and a phone number from which said incoming call was sent.

39. The apparatus in claim 36, wherein said communication platform provides voice mail services to an incoming call from an extension within said private branch exchange network in response to control signals describing said incoming call as a forwarded call and said extension having a corresponding configuration profile that dictates that all calls from said extension are to be forwarded to voice mail.

40. The apparatus in claim 36, wherein said communication platform includes a means for forwarding an incoming call from an extension within said private branch exchange network to a remote target telephone number serviced by a second communication platform in response to control signals describing said incoming call as a forwarded call, said remote target telephone number obtained from a configuration profile corresponding to said extension.

41. The apparatus in claim 32, wherein said communication platform further it includes a public switched telephone network interface that is managed and controlled by said computer system through program control, said program control established by using modules that make API calls to a programming interface, so that said communication platform can send and receive telephone calls through said voice communication module from a public switched telephone network.

42. The apparatus in claim 41, further including means for responding to control signals generated by a central office switch managing said public switched telephone network, said public switched telephone network interface networked to said public switched telephone network through said central office switch.

43. The apparatus in claim 42, wherein said communication platform includes means for forwarding an incoming call from said public switched telephone network to a second communication platform in response to control signals describing said incoming call as a forwarded call.

44. The apparatus in claim 43, wherein said control signals describes said incoming call by a call type and a phone number from which said incoming call was sent.

45. The apparatus in claim 42, wherein said communication platform provides voice mail services to an incoming call from a telephone within said public switched telephone network in response to control signals describing said incoming call as a forwarded call and said telephone having a corresponding configuration profile that dictates that all calls from said telephone are to be forwarded to voice mail.

46. The apparatus in claim 42, wherein said communication platform includes a means for forwarding an incoming call from a telephone within said public switched telephone network to a remote target telephone number serviced by a second communication platform in response to control signals describing said incoming call as a forwarded call, said remote target telephone number obtained from a configuration profile corresponding to said telephone.

47. The apparatus in claim 32, wherein said communications bus is a signal computing system architecture bus.

48. The apparatus in claim 32, further including a memory store and wherein said voice communication module is responsive to call status signals stored in said memory store.

49. The apparatus in claim 48, wherein said status signals includes a ring-no-answer status, a busy status, and live answer status.

50. The apparatus in claim 48, wherein said voice communication module uses at least one status signal stored in said memory store to provide messaging services.

51. The apparatus in claim 50, wherein said messaging services includes voice messaging.

52. The apparatus in claim 50, wherein said messaging services includes fax messaging.

53. A method for providing telecommunication services, the method comprising the steps of:

coupling a first communication platform to a first network and a second network, said first communication platform responsive to a request sent through said first network by providing telecommunication services that correspond to said request;

coupling a second communication platform to said first network and a third network, said second communication platform responsive to a request received from said first network by providing telecommunication services that correspond to said request, said first communication platform and said second communication platform each including a voice communication module running under program control;

managing said voice communication module so as to provide telecommunication services corresponding to said request, said telecommunication services including providing substantially real-time voice communications between a first caller connecting to said first communication platform through said second network and a second caller connecting to said second communication platform through said third network; and detecting private branch exchange service requests on either said first communication platform or said second communication platform and subsequently exchanging a plurality of signals between said first communication platform and said second communication platform for executing said private branch exchange services in response to said private branch exchange service requests.

54. The method in claim 53, wherein said first communication platform is responsive to a request sent through said second network by providing telecommunication services that correspond to said request.

55. The method in claim 53, wherein said second communication platform is responsive to a request sent through said third network by providing control signals generated by said private branch exchange equipment.

56. The method in claim 53, further including a step of sending control signals from said second network when a call from said second network is sent to said first communication platform.

57. The method in claim 56, wherein said control signals describes said call by a call type and a phone number from which said call was sent.

58. The method in claim 57, wherein said first communication platform responds to said call by forwarding said call to a communication platform servicing a remote target telephone number when said call type describes said call as a forwarded call and a configuration file associated with said phone number dictates that said call be forwarded to said remote target telephone number, said remote target telephone number obtained by said first communication platform from said configuration file.

59. The method in claim 58, wherein said second network is a private branch exchange network controlled by private branch exchange equipment and said phone number corresponds to an extension within said private branch exchange network.

60. The method in claim 58, wherein said second network is a public switched network controlled by a central office switch.

61. The method in claim 57, wherein said first communication platform responds to said call by forwarding said call to a communication platform servicing a remote target telephone number when said call type describes said call as a direct call and a caller that generated said call dictates that said call be forwarded to said remote target telephone number.

62. The method in claim 61, wherein said second network is a private branch exchange network controlled by private branch exchange equipment and said phone number corresponds to an extension within said private branch exchange network.

63. The method in claim 61, wherein said second network is a public switched network controlled by a central office switch.

64. The method in claim 53, wherein said first network is a switched communications backbone.

65. The method in claim 53, wherein said first network is the Internet.

66. The method in claim 53, wherein said second network is a private branch exchange network.

67. The method in claim 53, wherein said third network is a public switched telephone network.

68. The method in claim 53, wherein data communication between said communication platform and said voice communication module is accomplished through a memory store.

69. The method in claim 53, further including a step of coupling said communication platform with said voice communication module through a signal computing system architecture bus.

70. The method in claim 53, wherein said step of providing telecommunication services in response to a request received from said first network includes performing call progress analysis to obtain a request status.

71. The method in claim 70, wherein said request status includes a ring-no-answer status signal.

72. The method in claim 71, further including a step of responding to a ring-no-answer status signal by prompting a caller for a voice message.

73. The method in claim 71, further including a step of responding to a ring-no-answer status signal by prompting a caller for a fax message.

74. The method in claim 70, wherein said request status includes a busy status signal.

75. The method in claim 74, further including a step of responding to a busy status signal by prompting a caller for a voice message.

76. The method in claim 74, further including a step of responding to a busy status signal by prompting a caller for a fax message.

77. The method in claim 70, wherein said step of providing substantially real-time voice communication includes a step of responding to a live answer status signal.

78. A method for providing telecommunication services on a switched communication backbone, the method comprising the steps of:

providing a first communication platform having a telephone network interface and a voice communication module;

networking said first communication platform to a local telephone network through said telephone network interface, and to the switched communication backbone through said voice communication module;

wherein said first communication platform responds to a telephone call received from said local telephone network from a caller by:

receiving a telephone call, prompting for a destination telephone number, storing said destination telephone number in an internal memory when received, establishing a voice communication link with a destination communication platform that services a local area defined by said destination telephone number, said destination communication platform having a telephone network interface and a voice communication module, and passing said telephone number from said internal memory to destination communication platform through said voice communication link;

detecting private branch exchange service requests and subsequently exchanging a plurality of signals between said first communication platform and said destination communication platform for executing said private branch exchange services in response to said private branch exchange service requests; and wherein said destination communication platform responds to said telephone number by calling said destination telephone number, and establishing a live call if said step of calling results in a live answer status.

79. The method in claim 78, wherein said destination communication platform initiates a voice messaging service if said step of calling results in a ring-no-answer status.

80. The method in claim 78, wherein said destination communication platform initiates fax messaging services if said step of calling results in a ring-no-answer status.

81. The method in claim 78, wherein said destination communication platform initiates messaging services if said step of calling results in a busy status.

82. The method in claim 78, wherein said destination communication platform initiates fax messaging services if said step of calling results in a ring-no-answer status.

83. The method in claim 78, wherein said step of establishing said live call includes the steps of:

sending said live answer status to a voice communication module of said destination communication platform, said voice communication module switching said telephone call to an available time slot, said time slot coupling said telephone network interface and said voice communication module of said destination communication platform; and sending a packet of information indicating a live answer status to said first communication platform through the switched communication backbone via said voice communication module of said destination communication platform.

84. The method in claim 83, wherein said voice communication module of said first communication platform responds to said packet of information indicating a live answer status by sending an internal command indicating a live answer status and switching on said caller with an available time slot, said time slot establishing voice communication from said voice communication module of said first communication platform with said telephone network interface of said first communication platform.

85. A method for providing telecommunication services on the switched communication backbone, the method comprising the steps of:

providing a first and second communication platform, each of said platforms having a telephone network interface and a voice communication module;

networking said first communication platform to a local telephone network and said second communication platform to a remote telephone network;

networking said first and said second communication platforms to ultimately connect to the switched communication backbone through said voice communication module of said first communication platform and said voice communication module of said second communication platform, respectively; and wherein said first communication platform responds to a telephone call received from a caller on said local telephone network by:

prompting for a destination telephone number, storing said destination telephone number in an internal memory when received, establishing a voice communication link with a destination communication platform that services said destination telephone number, passing said telephone number from said internal memory to destination communication platform, initiating a telephone call using said destination telephone number through a telephone network coupled to said second communication platform; and detecting private branch exchange service requests on said first communication platform and subsequently exchanging a plurality of signals between said first communication platform and said destination communication platform for executing said private branch exchange services in response to said private branch exchange service requests.

86. The method of claim 85, further including a step of providing time slots in said first communication platform and said second communication platform if said telephone call is answered by a recipient.

87. The method of claim 86, further including a step of playing a voice prompt to said caller if said telephone call is not answered by a call recipient.

88. The method of claim 86, further including the step of placing said caller and said call recipient into separate time slots in response to an on-hold request by said caller.

89. The method of claim 88, further including the steps of:

placing a call to a third party in response to a telephone number received from said caller;

connecting said caller and said third party if said call is answered by said third-party; and connecting said call recipient with said caller and said third party if said caller places a conference request after said call is answered by said third party.

90. The method of claim 89, further including the step of removing all allocated time slots to said caller, said call recipient, and said third party after said caller hangs-up.

91. The method of claim 88, further including the steps of:

placing a call to a third party in response to a telephone number received from said caller;

connecting said caller and said third party if said call is answered by said third-party; and disconnecting said call recipient from said caller and connecting said third party to said call recipient, if said caller places a transfer request after said call is answered by said third party.

* * * * *

UNITED STATES PATENT AND TRADEMARK OFFICE
CERTIFICATE OF CORRECTION

PATENT NO. : 6,118,864
DATED : September 12, 2000
INVENTOR(S) : Chang et al.

It is certified that error appears in the above-identified patent and that said Letters Patent is hereby corrected as shown below:

1) In claim 55 replace "wherein said second communication platform is responsive to a request sent through said third network by providing control signals generated by said private branch exchange equipment"

with--wherein said second communication platform is responsive to a request sent through said third network by providing telecommunication services that correspond to said request--.

Signed and Sealed this

Third Day of July, 2001

*Attest:*

*Attesting Officer*

NICHOLAS P. GODICI
*Acting Director of the United States Patent and Trademark Office*